June 12, 1928.  
W. R. HUME  
1,672,941  
METHOD AND APPARATUS FOR MAKING CONCRETE PIPES  
Filed Nov. 15, 1926
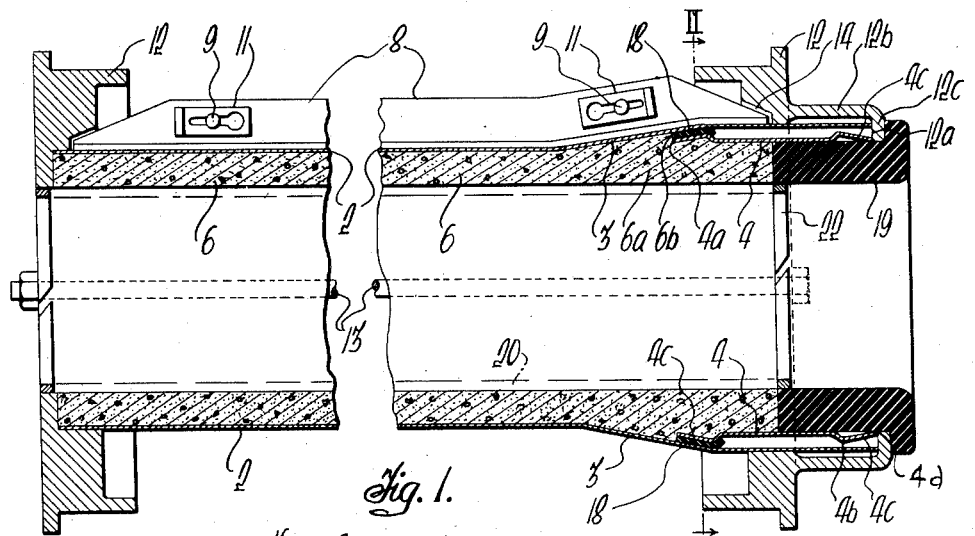
Fig. 1.
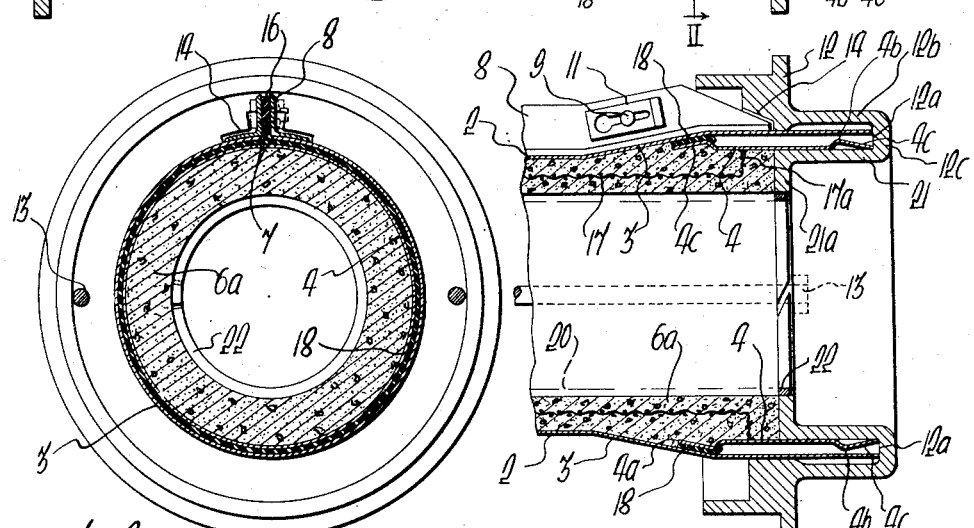
Fig. 2.    Fig. 3.
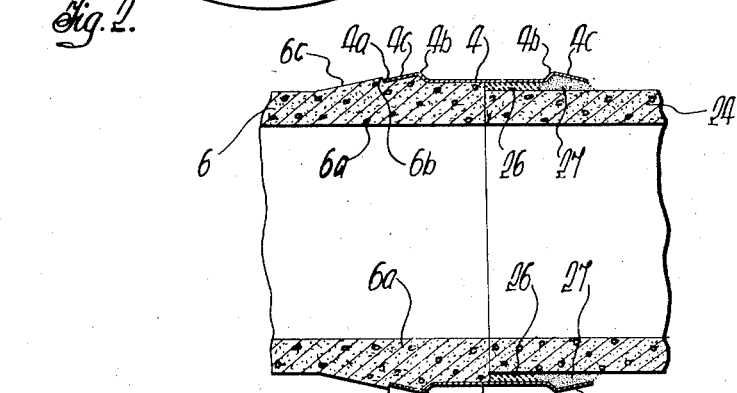
Fig. 4.
Inventor:
Walter Reginald Hume
By 
Attorney.

Patented June 12, 1928.

1,672,941

UNITED STATES PATENT OFFICE.

WALTER REGINALD HUME, OF MELBOURNE, VICTORIA, AUSTRALIA.

METHOD AND APPARATUS FOR MAKING CONCRETE PIPES.

Application filed November 15, 1926, Serial No. 148,553, and in Australia November 24, 1925.

This invention relates to concrete pipes, and refers more particularly to an improved end construction for centrifugally manufactured concrete pipes, either reinforced or non-reinforced, whereby the joining together of the ends of such pipes is facilitated and a highly efficient joint may be formed.

It has hitherto been customary to join together the ends of concrete pipes by placing a metal or other collar around the adjoining pipe ends and filling in the annular space between the collar and the outer circumference of the pipe with a suitable filling and jointing material. With such an arrangement it is necessary to hold the collar in proper concentric position around the pipe ends during the formation of the joint which consequently involves difficulty, particularly when forming the joint in a channel or other relatively inaccessible position. Furthermore, it is necessary to ram or pack the jointing material into the annular space between the pipe and collar on both sides of the joint.

The primary object of the present invention is to provide an external metal faucet as a permanent fixture upon and around the end or ends of a concrete pipe so that portion of this faucet projects beyond the concrete pipe extremity and is adapted to receive the plain or spigot end of an adjoining pipe when forming a joint. It is thus only necessary to introduce the filling or jointing material on one side of the joint, namely, into the annular space between the said spigot end and the projecting portion of the metal faucet which is permanently secured to the end of the other pipe as aforesaid.

Another object of the invention is to provide an improved method of and means for applying such metal faucet to the end of a concrete pipe during centrifugal manufacture, means being provided to prevent the escape of moisture and cement from the concrete between the inner end of the metal faucet and the surrounding mould casing in which the pipe is formed.

The improved pipe is particularly adapted for high pressure services for which the ordinary faucet ended concrete pipes are unsuited owing to the relative weakness of the moulded concrete faucet and the difficulty of effectively and economically reinforcing the latter.

Referring to the drawings which form part of this specification:—

Figure 1 is a longitudinal section through a centrifugal mould casing and illustrating the manufacture of a pipe in accordance with the invention.

Figure 2 is a cross section taken on the line II—II in Figure 1.

Figure 3 illustrates the improved end construction of a reinforced concrete pipe and modified means for forming same.

Figure 4 is a longitudinal section illustrating a joint and the manner of forming same between a pipe having the improved end construction and a plain or spigot ended pipe.

In the manufacture of a pipe in accordance with the invention a mould casing 2 having a flared or faucet shaped end portion 3, is employed. The metal faucet which is to be secured to the concrete pipe end is indicated by the reference numeral 4. Should it be desired to secure a metal faucet 4 to one end only of the pipe 6 and to provide a plain or spigot end at the other extremity thereof, the mould casing 2 is flared at one end only as seen in Figure 1, but it will be evident that, if desired, metal faucets 4 may be secured to both ends of the pipe 6 during the moulding operation, by employing a mould casing 2 which is flared or faucet shaped at both ends. Such pipes may be employed in conjunction with ordinary plain ended concrete pipes which are positioned within the projecting portions of the metal faucets.

The mould casing shown in the drawings is of known construction and consists of a relatively thin metal sheet which is rolled into cylindrical form. Extending along the outside of the mould casing adjacent the longitudinal meeting edges 7 thereof, are opposed angle pieces or members 8 which may be detachably fastened together by studs or pins 9 and wedge plates 11. The mould casing is fitted at each end with flanged runner wheels 12 whereby the casing may be supported and rotated by frictional contact with suitable driving wheels not shown. The outstanding flanges of the angle pieces 8 may be cut away at their ends to enable them to fit into recesses 14 formed in the runner wheels. A jointing strip 16 of rubber or the like may, if desired, be disposed between the angle pieces 8 to prevent moisture or cement escaping between the meeting edges 7 of the mould casing. The construction of the mould casing, apart from the provision of the flared end or ends 3 as aforesaid, and the driving means for the casing may, however, be of any other suitable form.

Prior to the introduction of the cementitious material into the mould casing the metal faucet 4 is positioned within the flared end of such casing so that it is carried round with the latter during rotation thereof, the inner edge 4$^a$ of the faucet being disposed adjacent the tapered or out-turned portion 3 of the flared mould end.

The metal faucet may be of plain cylindrical shape but it is preferably provided, adjacent its ends, with expressed circumferential ribs 4$^b$ and inwardly converging or tapered ends 4$^c$ which are designed to strengthen the collar and effectively retain the filling and jointing material used in the formation of the joint. This tapered end construction of the metal faucet, increases the security of the joint and is also adapted to anchor the collar more securely to the concrete pipe of which it forms part. Moreover the tapering of the mould casing and the inner end of the metal faucet gives rise to a self-centering action which ensures the faucet being readily positioned concentrically within the casing.

The flanged runner wheel 12 at the enlarged end of the mould is provided with an annular outward extension 12$^b$ from which a portion 12$^c$ projects radially inwards. When placed within the mould, the outer edge 4$^d$ of the metal faucet abuts against or adjoins the inner face 12$^a$ of the portion 12$^c$ so that the faucet is positioned between said face and the aforesaid out-turned or tapered portion 3 of the flared mould end and is thus prevented from moving longitudinally during rotation of the mould.

The internal diameter of the metal faucet 4 is greater than the normal external diameter of the pipe body 6, the pipe wall at 6$^a$ adjacent the faucet being of greater thickness than the body portion 6. This construction ensures that sufficient space will be left between the outer or projecting portion of the faucet and the external surface of the spigot end of an adjoining pipe, for the insertion of jointing material as will be hereinafter described. Furthermore, should it be desired to repair the pipe adjacent the inner end of the metal faucet, the concrete at the thickened portion 6$^a$ of the pipe wall may be chipped or cut away adjacent the inner edge 4$^a$ of the faucet, to provide a cavity for the reception of suitable caulking material, without unduly weakening the pipe.

A circumferential shoulder 6$^b$ is formed at the junction of the inner edge 4$^a$ of the metal faucet and the thickened portion 6$^a$ of the pipe wall and the external surface of the pipe tapers inwardly as at 6$^c$ from this shoulder to the normal outer circumference of the pipe body 6. The internal diameter of the pipe is preferably uniform throughout the length of the concrete wall.

If desired the pipe may be reinforced as shown, for example, in Figure 3. The reinforcement 17, which may be of the cage type, may extend parallel to the axis of the pipe and almost to each extremity of the concrete wall so that the thickened end portion or portions 6$^a$ is or are effectively reinforced. For high pressure services it is important that the thickened end portion 6$^a$ as well as the remainder of the pipe should be adequately reinforced, but existing methods of faucet ended concrete pipe construction have not permitted this to be carried out satisfactorily and economically, chiefly owing to the shape of the moulded concrete faucet and the difficulty of maintaining the reinforcement in a proper concentric attitude during the centrifugal moulding process. With the present invention however, the reinforcement 17 may be positioned and maintained in the desired concentric attitude by turning the end or ends of the reinforcement outwardly as at 17$^a$ so as to engage the interior of adjacent metal faucet 4 to which the out-turned end of the reinforcement may, if desired, be secured by spot welding or the like prior to the introduction of the cementitious material into the mould.

In order to prevent the escape of moisture and cement from the cementitious material or aggregate during the centrifugal process, a rubber or like flexible jointing ring 18 is inserted between the inner end portion of the metal faucet 4 and the adjacent flared portion 3 of the mould casing, this flexible jointing ring being held tightly in position so that it effectively prevents moisture and cement escaping between the faucet and the mould and consequently weakening the pipe at this point. The use of this jointing ring in the manner mentioned constitutes an important feature of the invention.

With the reinforcement 17, if any, the metal faucet 4, and the jointing ring 18 in position within the mould 2 the latter is rotated and the cementitious material is introduced to build up the pipe wall by centrifugal action in the usual manner. In order, however, to prevent the cementitious material from building up within the outer or projecting portion of the metal faucet, which outer portion requires to project beyond the extremity of the concrete pipe as aforesaid, an end ring or closure 19, which may be of rubber or any other suitable material may be removably positioned within this projecting portion of the faucet as seen in Figure 1, the thickness of said ring being determined according to the thickness of the concrete pipe wall to be formed within the faucet. Alternatively such end ring 19, may be dispensed with and the adjacent flanged runner wheel 12 provided with an annular inward extension 21 which projects from the portion 12ᶜ of the runner wheel into the outer or projecting portion of the metal faucet 4, as seen in Figure 3, this annular extension terminating at its inner end in a lip or shoulder 21ᵃ of the requisite internal diameter so as to close or partially close the outer portion of the metal faucet and thus exclude the cementitious material therefrom.

Supplemental expansion rings 22 of divided or split construction may also be fitted within the outer removable ring 19 as in Figure 1 or within the annular extension 21 of the flanged runner wheel as in Figure 3 to retain additional or surplus cementitious material around the interior of the pipe as indicated at 20, during consolidation of the pipe wall by centrifugal action. This surplus or additional material may be removed and the interior of the pipe thus finished or smoothed off by the aid of a circular trowel or the like when the split rings 22 are removed.

After the mould has been rotated for a sufficient period to build up the desired thickness of the pipe wall and to ensure the desired consolidation of the cementitious material the end rings 19 and 22 may be removed, and when the pipe has set sufficiently, the mould casing 2, flanged runner wheels 12, and the aforesaid flexible jointing ring 18 are also removed, thus leaving the metal faucet 4 permanently fixed around the exterior of the concrete pipe end, the wall of which is thickened as aforesaid owing to the building up of the material within the flared end of the mould casing and the metal faucet. From this thickened end portion 6ᵃ of the concrete pipe the surrounding metal faucet projects longitudinally for a suitable distance preferably about one half its length as shown.

When it is desired to form a joint with the improved pipe 6, the plain or spigot end of another pipe 24 of lesser external diameter than the internal diameter of the metal faucet 4, is placed within the projecting portion of the latter as seen in Figure 4, and a suitable jointing material such, for instance, as a plastic bituminous composition 26, is then poured, rammed or placed within the inner portion of the annular space between said projecting portion of the faucet 4 and the pipe end enclosed thereby. A cementitious or other suitable filling material 27 may then be poured or rammed into the outer portion of said annular space so as to retain the plastic jointing material 26 and form a highly efficient joint.

The formation of a joint as abovementioned may be effected with a minimum expense of time and labour, the joint being closed at one side by the said jointing and filling materials 26 and 27 and at the other side by the enlarged portion 6ᵃ of the concrete pipe to which the surrounding metal faucet 4 is permanently secured during the moulding operation.

Having now described my invention what I claim as new and desire to secure by Letters Patent is:—

1. The method of making a faucet ended concrete pipe which consists in moulding the pipe by centrifugal action so that the cementitious material at an end thereof is built up within a metal faucet which is thus permanently adhered to the exterior of the pipe end, closing or partially closing an outer portion of said faucet during the centrifugal process so as to exclude the cementitious material from said portion which projects beyond the adjacent extremity of the resultant concrete pipe, and forming a liquid tight joint between the inner edge of said metal faucet and the adjacent internal surface of the surrounding mould during the process for the purpose specified.

2. The method of making a faucet ended concrete pipe which consists in moulding the pipe by centrifugal action so that the cementitious material at an end thereof is built up within a metal faucet which is thus permanently adhered to the exterior of the pipe end, closing or partially closing an outer portion of said faucet during the centrifugal process so as to exclude the cementitious material from said portion which projects beyond the adjacent extremity of the resultant concrete pipe, and inserting a flexible jointing ring between the exterior of the metal faucet adjacent its inner edge, and the adjoining internal surface of the centrifugal mould for the purpose specified.

3. The method of making a faucet ended concrete pipe which consists in moulding the pipe by centrifugal action, with an end thereof within a metal faucet which is thus permanently adhered to the exterior of the pipe end, positioning an end ring or closure within the outer portion of said metal faucet prior to the introduction of the cementitious material into the mould so that the concrete pipe wall terminates at said ring or closure and the cementitious material is excluded from the outer portion of said faucet which projects beyond the adjacent extremity of the resultant concrete pipe and subsequently removing said end ring or closure from said projecting outer portion of the faucet for the purpose specified.

4. The method of forming a faucet ended concrete pipe which consists in placing a metal faucet within the flared or enlarged end portion of a centrifugal pipe mould, inserting a flexible jointing ring between the internal surface of said mould and the external surface of said faucet adjacent the inner edge of the latter, closing or partially closing the outer portion of said faucet so as to exclude the cementitious material therefrom during the centrifugal process, and introducing the cementitious material so that the pipe wall is built up by the centrifugal action within said mould and the inner portion of said faucet for the purpose specified.

5. The method of making a faucet ended concrete pipe which consists in moulding the pipe by centrifugal action with an end thereof within a metal faucet which is thus permanently adhered to the exterior of the pipe end, closing or partially closing an outer portion of said faucet during the centrifugal process so as to exclude the cementitious material from said portion which projects beyond the adjacent extremity of the resultant concrete pipe, and inserting within the mould and the metal faucet a reinforcement having its end portion out-turned so as to engage the inner surface of said faucet for the purpose specified.

6. Apparatus for the manufacture of concrete pipes comprising in combination a centrifugal pipe mould, a metal faucet adapted for insertion within an end portion of said mould and to be permanently adhered to the exterior of the concrete pipe end, and means for closing or partially closing the outer end portion of said faucet so as to exclude the cementitious material of the pipe wall from said portion during the centrifugal process for the purpose specified.

7. Apparatus for the manufacture of concrete pipes consisting in the combination of a centrifugal pipe mould, a metal faucet adapted for insertion within an end portion of said mould and to be permanently adhered to the exterior of the concrete pipe end so as to project lengthwise therefrom, and means for forming a liquid tight joint between the inner surface of the mould and the external surface of said faucet adjacent the inner edge of the latter for the purpose specified.

8. Apparatus for the purpose indicated comprising in combination a centrifugal mould having an enlarged or flared end portion, a metal faucet adapted for insertion within said enlarged end portion of the mould and to be permanently secured to the exterior of the concrete pipe end, a flexible jointing ring adapted for insertion between the internal surface of the mould and the external surface of said faucet adjacent the inner edge of the latter, and means for closing or partially closing the outer end portion of said faucet so as to exclude the cementitious material therefrom during the centrifugal process of forming the concrete pipe.

9. Apparatus for the manufacture of concrete pipes comprising in combination a centrifugal pipe mould, a metal faucet adapted for insertion within an end portion of said mould and to be permanently adhered to the exterior of the concrete pipe end, means for closing or partially closing the outer end portion of said faucet so as to exclude the cementitious material of the pipe wall from said portion during the centrifugal process, and a flanged runner wheel adapted for mounting around said end portion of the mould, said runner wheel having an annular outward extension which accommodates the projecting outer portion of the metal faucet.

10. Apparatus for the manufacture of concrete pipes comprising in combination a centrifugal pipe mould, a metal faucet adapted for insertion within an end portion of said mould and to be permanently adhered to the exterior of the concrete pipe end, means for closing or partially closing the outer end portion of said faucet so as to exclude the cementitious material of the pipe wall from said portion during the centrifugal process, and a flanged runner wheel adapted for mounting around said end portion of the mould, said runner wheel having an annular outward extension which accommodates the projecting outer portion of the metal faucet, said outward extension of the runner wheel having a radially inturned portion which engages the outer extremity of the metal faucet substantially as and for the purpose specified.

11. Apparatus for the manufacture of concrete pipes comprising in combination a centrifugal pipe mould, a metal faucet adapted for insertion within an end portion of said mould and to be permanently adhered to the exterior of the concrete pipe end, means for closing or partially closing the outer end portion of said faucet so as to exclude the cementitious material of the pipe wall from said portion during the centrifugal process, and a flanged runner wheel adapted for mounting around said end portion of the mould, said runner wheel having an annular outward extension which accommodates the projecting outer portion of the metal faucet, and an annular inwardly extending portion disposed within said outward extension and adapted to fit within the outer portion of the metal faucet substantially as and for the purpose specified.

12. Apparatus for the manufacture of concrete pipes comprising in combination a centrifugal pipe mould, a metal faucet adapted for insertion within an end portion of said mould and to be permanently adhered to the exterior of the concrete pipe end, means for closing or partially closing the outer end portion of said faucet so as to exclude the cementitious material of the pipe wall from said portion during the centrifugal process, and a separate and removable end ring adapted to fit within the outer portion of the metal faucet during the centrifugal process substantially as and for the purpose specified.

In testimony whereof I affix my signature.

WALTER REGINALD HUME.